US006963559B2

United States Patent
Elo

(10) Patent No.: US 6,963,559 B2
(45) Date of Patent: Nov. 8, 2005

(54) ARRANGEMENT OF LOCAL AREA NETWORK

(75) Inventor: Harri Elo, Helsinki (FI)

(73) Assignee: Nokia Corporation, Espoo (FI)

( * ) Notice: Subject to any disclaimer, the term of this patent is extended or adjusted under 35 U.S.C. 154(b) by 780 days.

(21) Appl. No.: 09/864,554

(22) Filed: May 23, 2001

(65) Prior Publication Data

US 2002/0176435 A1 Nov. 28, 2002

(51) Int. Cl.⁷ ............................................. H04M 11/06
(52) U.S. Cl. ..................................... 370/353; 379/93.09
(58) Field of Search ................................ 370/351–356, 370/400, 401, 419, 420; 379/93.01, 93.05, 93.07, 93.09, 399.01, 93.06, 93.14

(56) References Cited

U.S. PATENT DOCUMENTS

| | | | | |
|---|---|---|---|---|
| 5,623,543 A | * | 4/1997 | Cook | 379/402 |
| 5,930,340 A | * | 7/1999 | Bell | 379/93.08 |
| 6,285,754 B1 | * | 9/2001 | Sun et al. | 379/399.02 |
| 6,298,037 B1 | * | 10/2001 | Sharifi | 370/210 |
| 6,452,923 B1 | * | 9/2002 | Gerszberg et al. | 370/352 |
| 6,690,677 B1 | * | 2/2004 | Binder | 370/465 |
| 6,778,646 B1 | * | 8/2004 | Sun | 379/93.05 |
| 2001/0030950 A1 | * | 10/2001 | Chen et al. | 370/329 |
| 2003/0035471 A1 | * | 2/2003 | Pitsoulakis | 375/222 |

FOREIGN PATENT DOCUMENTS

| | | |
|---|---|---|
| EP | 1065829 | 1/2001 |
| EP | 1126688 | 8/2001 |
| WO | WO 00/62522 | 10/2000 |
| WO | WO 01/56182 | 8/2001 |

* cited by examiner

Primary Examiner—Ricky Ngo
Assistant Examiner—Duc Duong
(74) Attorney, Agent, or Firm—Squire, Sanders & Dempsey L.L.P.

(57) ABSTRACT

This invention relates to LANs at a customers' premise, especially to the HomePNA technique. The idea of the invention is that voice band terminals and HomePNA (HPNA) stations are hidden from a distribution network by a band division filter in a way that performance of ADSL is not degraded by presence of an HPNA LAN. The band division filter incorporates two subfilters: a POTS filter and an HPNA filter. The latter implements a band stop function maximizing insertion loss at the ADSL band. The band division filter can be installed to needed telephone sockets.

23 Claims, 6 Drawing Sheets

ARRANGEMENT OF LOCAL AREA NETWORK

FIELD OF THE INVENTION

This invention relates to LANs at customers' premises, especially to the HomePNA technique. More particularly, the invention relates to the separation of signals at LAN of a DSL (Digital Subscriber Line) subscriber.

BACKGROUND OF THE INVENTION

The need of data transmission capacity has grown remarkably during the last years. Since most subscriber lines are twisted pair cable, originally designed for voice transmission, new techniques have been developed to increase the capacity of subscriber lines for satisfying continually growing demands. Different DSL (Digital Subscriber Line) techniques even reach transmission speeds of several Mbit/s. Especially, ADSL (Asymmetric Digital Subscriber Line) has become popular.

There are some problems in the ADSL technique. Pair lines considerably attenuate the signals on ADSL frequencies (25–1100 kHz), when the attenuation is at the strongest level at the high frequency end of the bandwidth. The attenuation also depends on the distance between an exchange and customer. In an urban area, where most customers are, the maximum capacity can be achieved (inside a distance of about 2 km from the exhange) in most cases. Customers inside the distance of about 5 km from the exhange can be reached by ADSL but not at maximum capacity.

Another problem is that a twisted pair line has to transmit both the original POTS (Plain Old Telephone System) traffic and the ADSL traffic. One solution is that the distribution network in a customer's premise is divided into two parts: the part for POTS traffic and the other part for ADSL traffic. In other words, at least one pair line is allocated to the ADSL traffic. The division of the lines is done in a distribution cabinet at the customer's premise wherein a splitter is installed. FIG. 2 shows an example of a divided distribution network. The splitter 10 is inside the cabinet 13, which also contains the distribution cabinet 1. One pair line 8 forms a distribution network for POTS signals, and the other line 9 forms a distribution network for ADSL traffic. An ADSL station 7, which uses ADSL as a transmission technique, is connected to an ADSL modem 5 (inside or outside the terminal), which in turn is connected to a telephone socket 3.

The installation of the splitter and the division of the network requires a visit from an installer, which increases the operator's costs and is annoying for the customer. At present, operators prefer self-installation solutions wherein customers can make installations themselves. FIG. 1 shows an example of a self-installation. The incoming ADSL traffic is distributed from the distribution cabinet 1 through the distribution network 2, i.e. through a normal pair line, POTS terminals 6 are connected to low-pass filters 4, which are connected to telephone sockets 3. The low-pass filters protect the POTS terminals against ADSL signals, which can be interfering, and vice versa. The ADSL station 7 is connected to the ADSL modem 5 (an external or internal element), which is connected to the telephone socket 3. Both the low-pass filters and the modem should preferably be installable without tools.

A new interesting area has recently come out. The number of customers, who have more than one computer, has become greater and greater. Often, these customers want to connect their computers, forming a home network. It is also to desired to connect the computers to the Internet. There are several techniques offering home networks, such as wireless LANs, techniques using power supply networks, and techniques using twisted pair line networks. A technique, called HomePNA (Home Phone Networking Alliance), is the technique of using POTS networks.

The Home Phone Networking Alliance aims to achieve a home network structure wherein no changes are needed in physical transmission media. HomePNA utilizes POTS lines in a customer's premise. HomePNA performs LAN (Local Area Network) through which the customer's computers can communicate with each other. The LAN also makes it possible to divide the Internet connection with devices connected to the LAN, such as computers and printers. FIG. 3 shows an example of HomePNA. A gateway 31, such as a cable modem or ADSL modem, performs a connection between the Internet and HomePNA.

Since HomePNA is a technique utilizing POTS lines, it is safe. Transmission lines are inside the customer's premise, and the only connection to the outside world is the gateway. That is not possible when using wireless or power supply transmission, since in these cases the transmission media carries traffic of several customers. It is possible to encrypt the traffic, but congestion may occur when several customers use the same transmission media. Briefly, HomePNA seems to be a good technique for forming a LAN in a customer's premise.

However, there are some difficulties in realizing a HomePNA network, particularly when a customer is an ADSL subscriber. The Home Phone Networking Alliance prefers that customers do not need to install any filters to their telephone sockets as illustrated in FIG. 3. This may work nice if a customer is a POTS subscriber (the gateway to the outside is a cable modem and the subscriber loop is a POTS line), but if the customer is an ADSL subscriber (the gateway to the outside is an ADSL modem and the subscriber loop is an ADSL line), the situation is much more complex. For example, low-pass filters should be installed at the telephone sockets as illustrated in FIG. 1.

An ADSL line is very sensitive to external loads— especially a nonlinear load is fatal. HomePNA stations look like capacitive and nonlinear loads to an ADSL line. FIG. 4 shows an example of the equivalent circuit of a HomePNA station (version 1.0/1.1) seen from an ADSL line. As can be seen, the station performs a serial LC resonator, which generates a zero impedance at the frequency range of ADSL, as shown in FIG. 5. The ADSL frequency range is from the upper end of the POTS frequency range (about 4 kHz in POTS and 100 kHz in ISDN) to about 1.1 MHz as illustrated in FIG. 6.

The aim of this invention is to eliminate the above-mentioned drawbacks and to offer an as easy as possible solution to perform a LAN inside a customer's premise utilizing POTS lines, when the customer is an ADSL (or possibly another type of xDLS) subscriber.

SUMMARY OF THE INVENTION

The idea of the invention is that a band division filter separates the POTS and HomePNA (HPNA) frequency ranges from the traffic carried by a distribution network in a way that the band division filter does not disturb the frequency range of ADSL. This is achieved by designing the HPNA filter part of the band division filter for maximizing the insertion loss in the frequency range of ADSL, i.e.

maximizing impedance at the ADSL band. The band division filter can be installed to telephone sockets needed. So only one filter element type is needed to be delivered to a customer. The band division filter does not unnecessarily load the distribution network, if it is open, i.e. a HPNA device is not connected to it. The arrangement according to the invention also comprises an ADSL/HPNA gateway for making a conversion from ADSL signals to HPNA signals, and vice versa.

So, the invention concerns an arrangement of a local area network in a customer's premise comprising a gateway through which the local area network is connected to an outside network via an xDSL subscriber line, in which local area network band division filters are connected to sockets of the local area network for separating voice band signals and traffic of the local area network both the voice band signals and the traffic distributed by the local area network, and for connecting voice band terminals and network stations to the local area network. Transmission lines of the local area network are formed from telephone lines in the customer's premise. In other words, the band division filters distribute and separate the signals and the traffic in the transmission lines to the voice band terminals, such as phones, and to the network stations forming the local network connected via the telephone lines. So, a number of the voice band terminals and the network terminals are connected to the same line.

Furthermore, the invention concerns a filter for a local area network in a customer's premise wherein the filter is connected to a socket of the local area network for separating voice band signals and traffic of the local area network both the voice band signals and the traffic distributed by the local area network, and for connecting voice band terminals and network stations to the local area network. The filter comprises two parts, the first part being formed from a low-pass filter between the voice band terminal and the local area network, passing through the voice band signals and stopping ADSL signals and the traffic of the local area network, i.e. HPNA signals, and the second part being formed from a band stop filter between the network station and the local area network, passing through the traffic of the local area network and stopping ADSL signals.

Briefly, the invention makes it possible for an ADSL (or xDSL) subscriber to connect HPNA devices to his telephone sockets for forming an individual LAN.

BRIEF DESCRIPTION OF THE DRAWINGS

In the following the invention is described in more detail by means of FIGS. 1–14 in the attached drawings where.

DETAILED DESCRIPTION OF THE INVENTION

Figure 1:
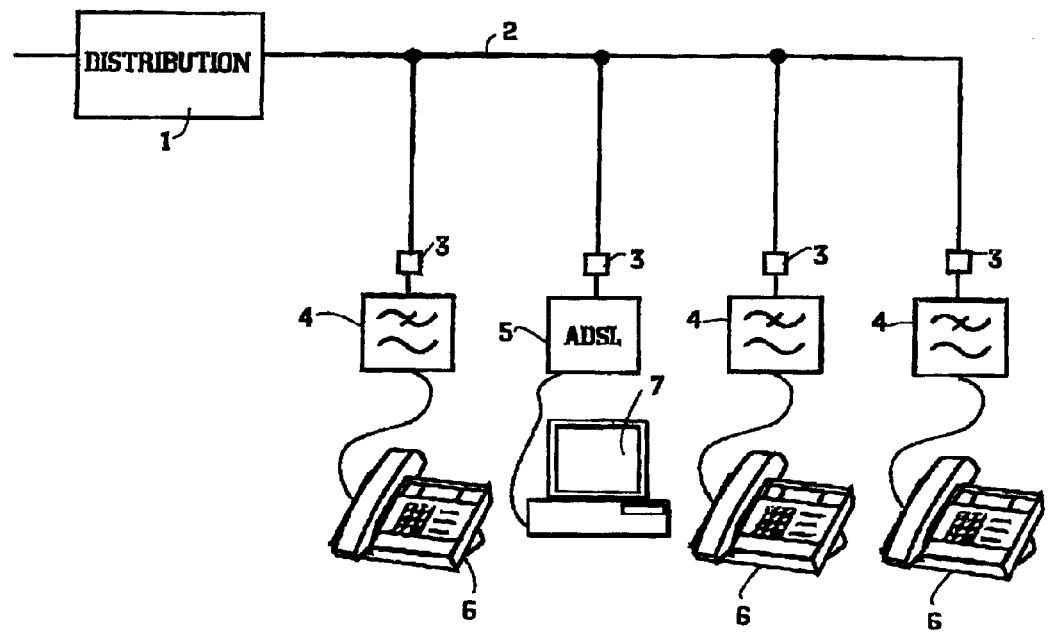
FIG. 1 illustrates an example of a known distribution network in a premise of an ADSL customer.
Figure 2:
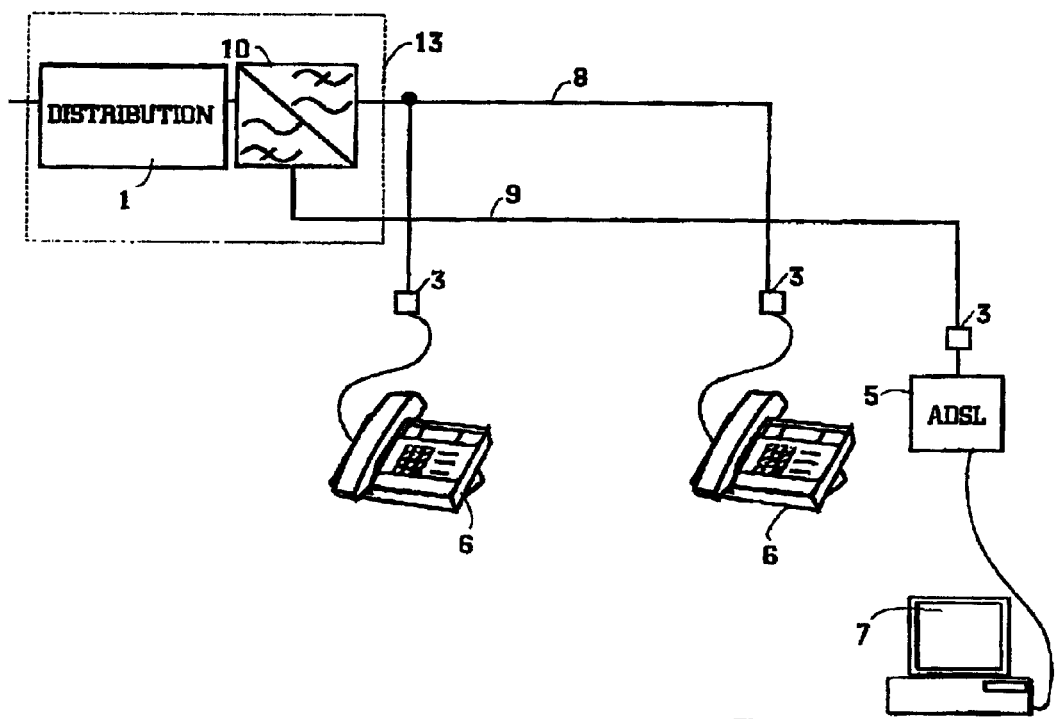
FIG. 2 illustrates another example of a known distribution network in a premise of an ADSL customer.
Figure 3:
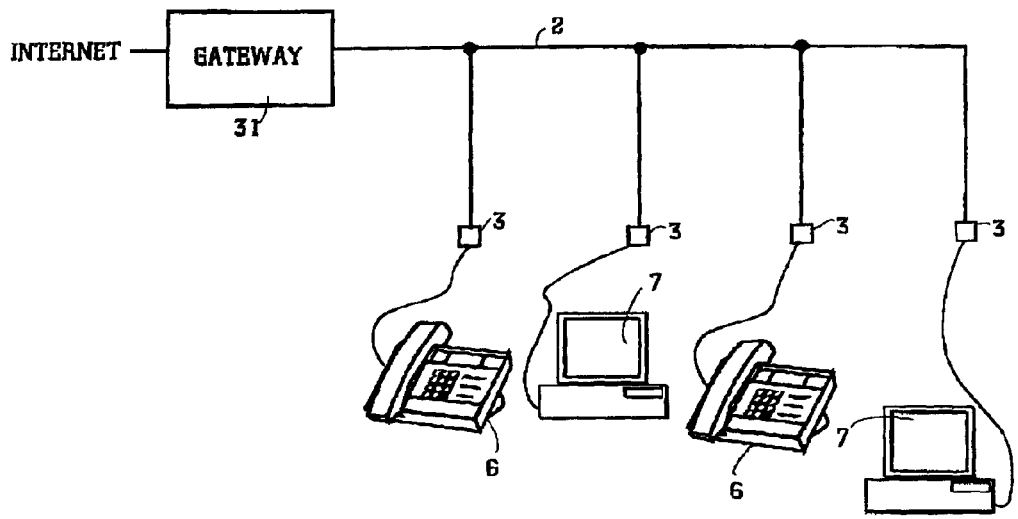
FIG. 3 illustrates an example of a known LAN in a customer's premise.
Figure 4:
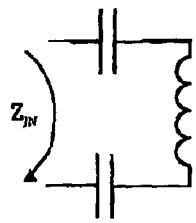
FIG. 4 illustrates an example of the equivalent circuit of a HomePNA station (version 1,0/1.1) seen from an ADSL line.
Figure 5:
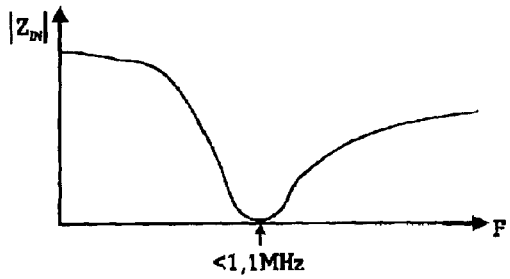
FIG. 5 illustrates an example of a zero impedance of a HomePNA station (version 1.0/1.1) in the frequency range of ADSL.
Figure 6:
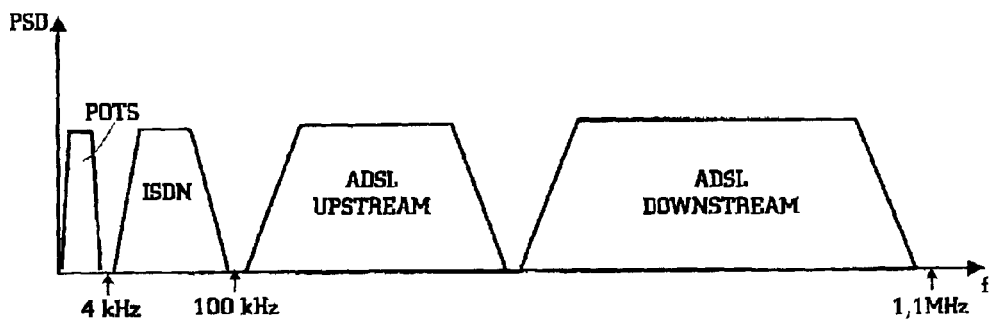
FIG. 6 illustrates the frequency ranges of POTS and ADSL.

As mentioned before, usually there is no problem when a subscriber uses a POTS line as a transmission technique to the outside world. But if the subscriber uses an ADSL line as a transmission technique, problems exist. As showed in FIGS. 1 and 2, the computer (and another device), which uses ADSL, is connected to the ADSL modem, which in turn is connected to the telephone socket. POTS terminals are behind low-pass filters. When it is desired to connect the computers together forming a LAN inside the customer's premise, a new frequency range becomes apparent, namely the frequency range of the LAN. In this context, primarily the LAN of HPNA is described. The frequency range of HPNA is about 4–10 MHz. So it is above the frequency ranges of POTS and ADSL as can seen in FIG. 6. So, there are 3 different types of signals in a distribution network, which should be kept separate from the terminals or stations of each other signal type.

Figure 7:
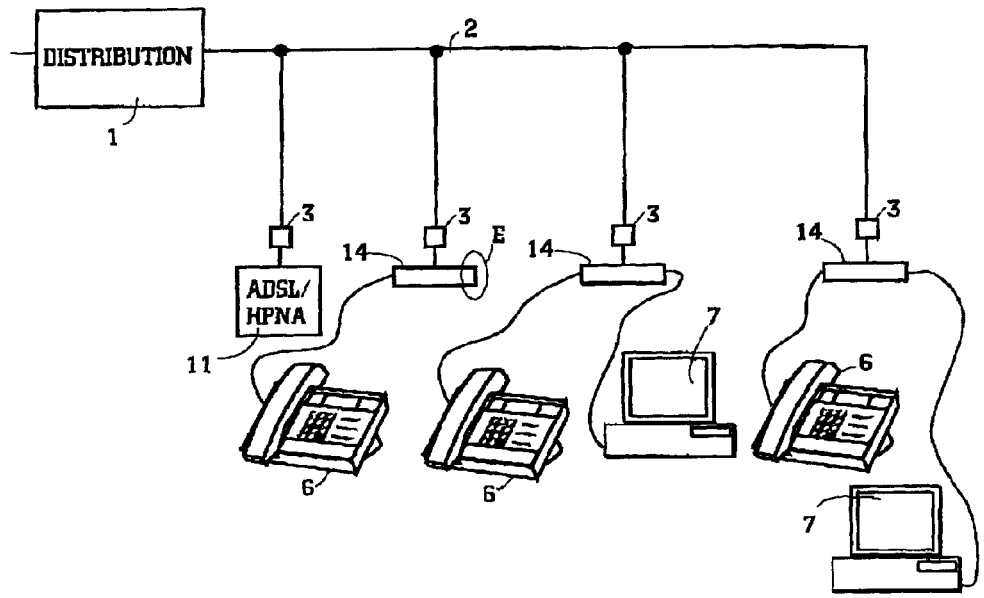
FIG. 7 illustrates an example of an arrangement according to the invention.

FIG. 7 shows an example of an arrangement according to the invention. An ADSL (or another xDSL) subscriber line is distributed to a customer's premise from a distribution cabinet 1. The subscriber loop forms the distribution network 2 inside the customer's premise. An ATU-R (ADSL Transceiver Unit, Remote terminal unit) modem 11 is connected to one of the telephone sockets 3 forming a gateway between the HPNA and ADSL. The ATU-R converts ADSL signals to HPNA signals and vice versa. The other sockets are connected to band division filters 14 to which the customer's terminals and stations are connected. The POTS terminals 6 are connected to the low-pass filter part (POTS part) of the band division filters, and the HPNA stations 7 to the HPNA filter parts.

The HPNA filter part is designed in a way that it and the station connected to it disturb ADSL signals as little as possible. Thus an open HPNA filter part E does not interfere with ADSL. It should be noticed that discarding the band division filter, the ADSL terminal can be connected to any socket 3 of the LAN.

Figure 8:
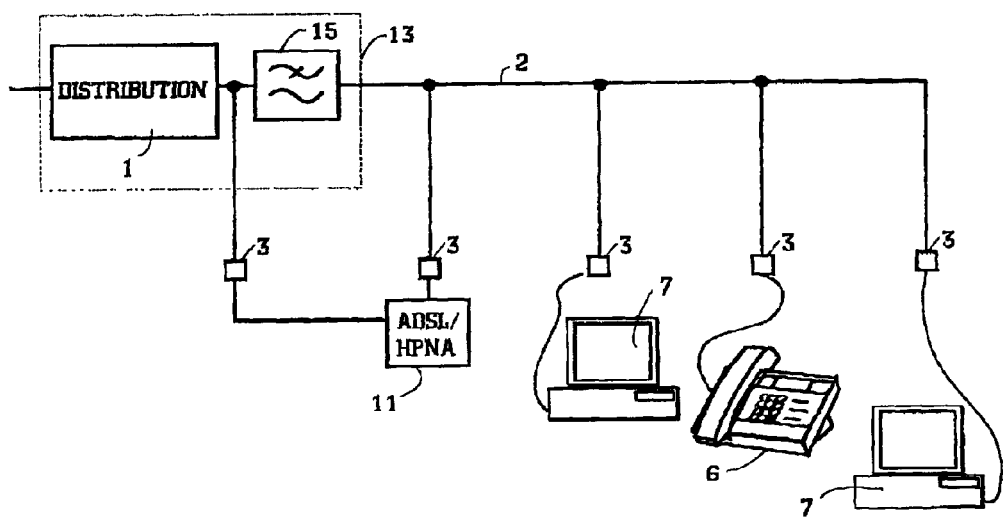
FIG. 8 illustrates another example of an arrangement according to the invention.

FIG. 8 shows another example of an arrangement according to the invention. In this case, a central low-pass filter 15 is installed inside the same cabinet 13 as the distribution cabinet 1. One socket is not behind the central low-pass filter seen from the outside network, so it is possible to connect an ATU-R to this socket. The ATU-R is also possible to connect to another socket, which is behind the central low-pass filter.

Through this socket and the ATU-R, HPNA stations have a connection to the outside, to the Internet. The ATU-R comprises a band-stop filter or a high-pass filter for HPNA traffic. However, in this case, placement of the ADSL terminal is confined behind the central low-pass filter, the installation of which is performed by the provider of the ADSL service.

Figure 9:
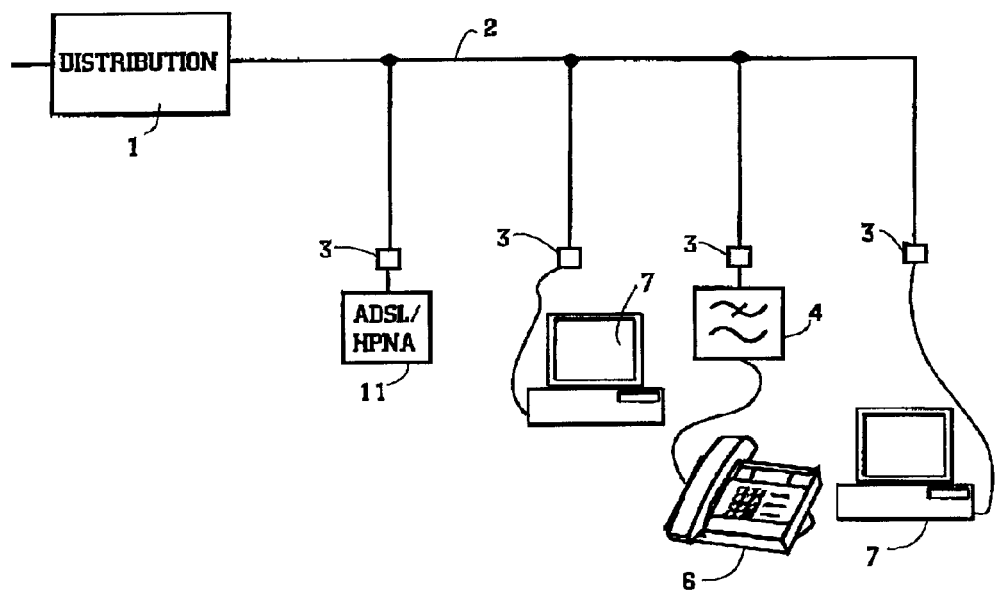
FIG. 9 illustrates an example of a possible arrangement for HomePNA.
Figure 10:
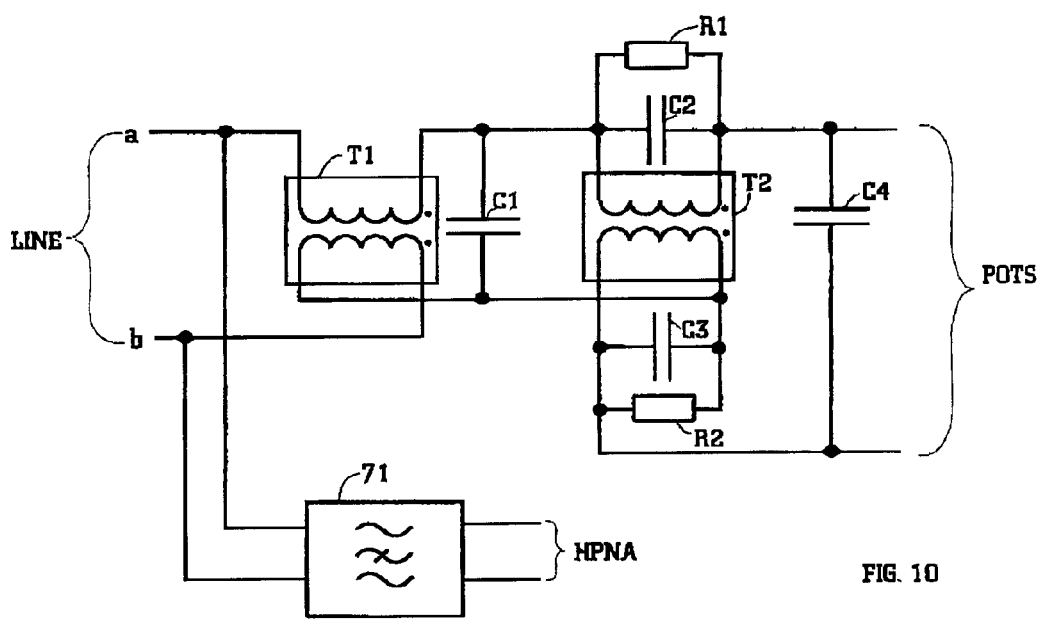
FIG. 10 illustrates an example of an electric circuit of the POTS part of the band division filter according to the invention.

FIG. 9 shows a third example of an arrangement, which can be possible, but it is not recommendable. If only POTS terminals are behind isolating filters, HPNA stations degrade the performance of ADSL, FIG. 10 shows an example of an electric circuit from the POTS part of the band division filter. Lines a and b provide the distribution network inside the customer's premise. The POTS filter in itself is a know solution. Transformer T1 between lines a and b filters out higher frequencies. Capacitor C1 also filters out high frequencies. Capacitor C4 has the same function as capacitor C1. Transformer T2 forms an matching impedance with the aid of capacitors C2 and C3, and with resistors R1 and R2. Usually the POTS filter comprises 1 to 3 transformers. The use of two transformers is a good compromise between cost and performance. The band-stop filter 71 filters traffic in the distribution network for HPNA stations.

Figure 11:
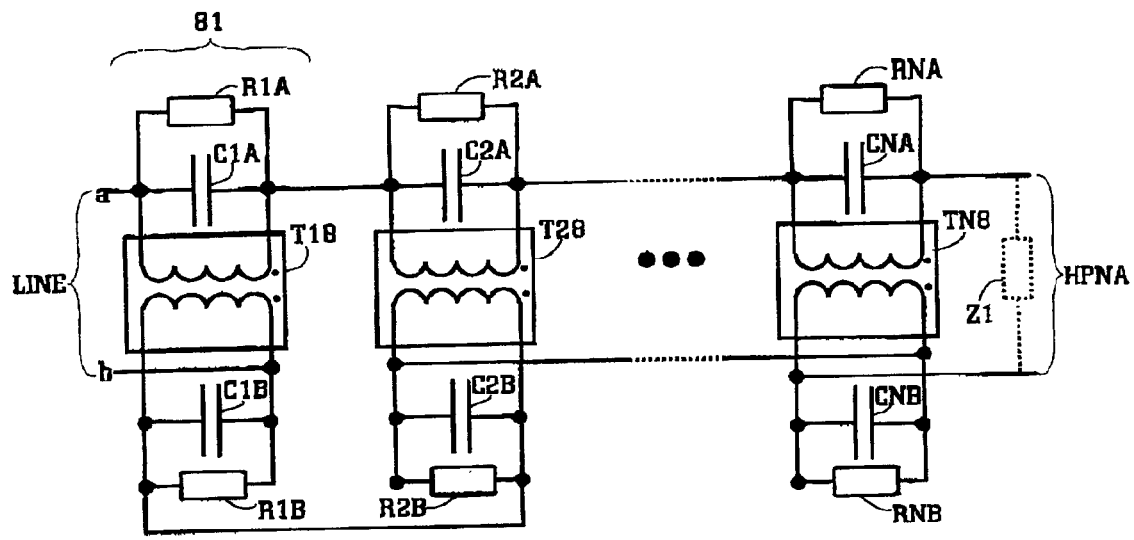
FIG. 11 illustrates an example of an electric circuit of the HomePNA part of the band division filter according to the invention.

FIG. 11 shows an example of an electric circuit of the band-stop filter 71. As can be noticed, the electric circuit comprises a number of similar circuits 81 in series. Transformers T18 to TN8 between wires of the pair line, i.e. lines a and b, filter out ADSL band frequencies with capacitors C1A to CAN and resistors R1A to RNA. The combination of components R1A, C1A, and T18 performs a parallel resonator, as well as the combinations R2A/C2A/T28, RNA/CNA/TN8, R1B/C1B/T18, R2B/C2B/T28, and RNB/CNB/TN8. The band-stop filter is designed in a way that it maximizes insertion loss in the ADSL frequency range.

The impedance values of the resistors and transformers are great compared to the impedance values of the capacitors in the HPNA frequency range (about 4–10 MHz), so at the HPNA frequencies the equivalent circuit of the band-stop filter is capacitors in series If the capacitor of this equivalent circuit is at least one nF, the band-stop filter is almost invisible from the view of HPNA traffic, in other words, it does not decrease the performance of HPNA essentially. In fact, the band-stop filter may increase the performance of HPNA since it attenuates disturbances in the ADSL frequency range.

As can be seen in FIG. 11, preferably no transversal element Z1 between lines a and b exists in the band-stop filter. In this way, the unterminated band stop filters do not contribute loading of the ADSL line. It should be noticed, that the effect of HPNA stations in the distribution network depends on how many stations are connected to the network, i.e. the total impedance of the HPNA stations decreases inversely proportionally to the number of the stations. It is also worth noting that in some cases the transversal element Z1 can be useful.

Figure 12:
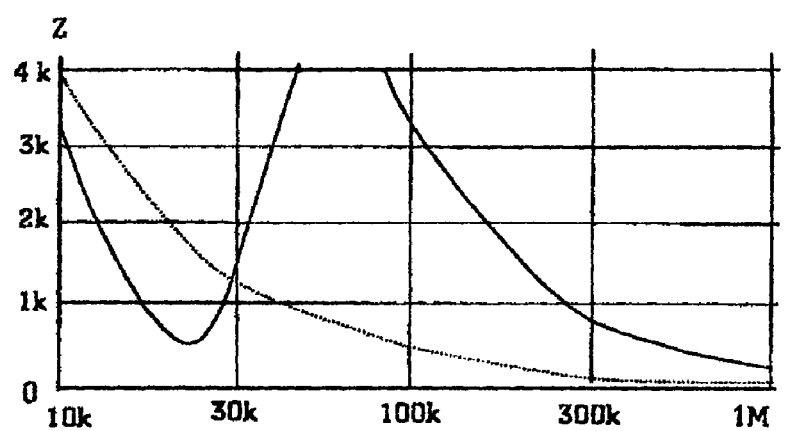
FIG. 12 illustrates examples of the impedances of a HPNA 1.1 station with and without the band-stop filter according to the invention.
Figure 13:
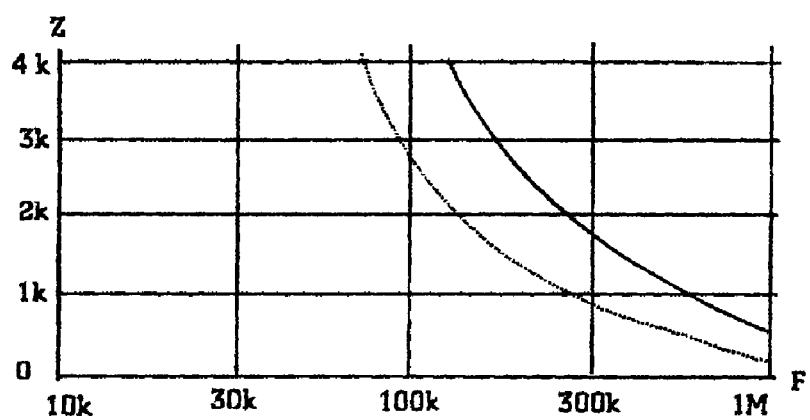
FIG. 13 illustrates examples of the impedances of a HPNA 2.0 station with and without the band-stop filter according to the invention.

A good result seems to be achieved using only one circuit 81 (a single stage solution). Comparing a HPNA station with a single stage band-stop filter according to the invention to a HPNA station without any filter, the improving effect of the band-stop filter is noticed. FIG. 12 shows impedances of the HPNA 1.1 station with and without the band-stop filter, and FIG. 13 shows the HPNA 2.0 station with and without the band-stop filter. The HPNA 2.0 station is a newer and more sophisticated version than version 1.1. The dashed lines are without the filter, and the solid lines with the filter.

As can be noticed, the HPNA 1.1 station without the filter forms a short circuit above 300 kHz due to ADSL does not working or working improperly. The band-stop filter provides a significant improvement. Also in the case of the HPNA station 2.0 the improvement is noticeable, since the impedance of the plain HPNA station 2.0 is usually disturbingly nonlinear from the point of view of ADSL.

Figure 14:
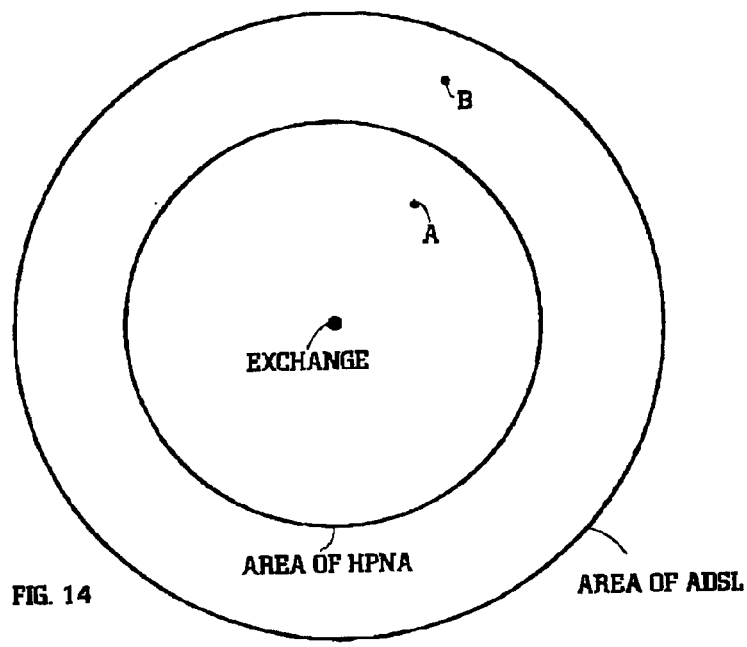
FIG. 14 illustrates an example of a transmission area for ADSL customers around an exchange.

FIG. 14 shows an example of a transmission area for ADSL customers around an exchange. The smaller circle is the area wherein customers can install HPNA to their premises without the performance of the ADSL transmission suffering too much. The larger circle is the area wherein ADSL is available. So customer A can use HPNA, but customer B can't. For enlarging the area of HPNA, the band-stop filter according to the invention must be used when connecting a HPNA station to a customer's distribution network. Thus, when installing the band division filters to his sockets, customer B has a real possibility to perform a HPNA network in his premise.

The arrangement according to the invention preferably offers only one filter component, which can be used with a POTS terminal, a HPNA station, or with both the terminals and stations. The filter also provides a distribution function, which can be a very useful feature when there are not many sockets in a customer's premise. The filter, i.e the band division filter is self-installable, and since it can be used with a POTS terminal and HPNA stations, chances for misinstallations are eliminated. One component is also easier to handle logistically. Present ADSL subscribers can be quite confident that when they install a HPNA network in their premise, the ADSL transmission works well after the installation.

It should be mentioned that the subscriber line in the inventive arrangement may transmit ISDN signals as well. So, the customer is an ISDN and ADSL subscriber. In this case, the gateway must also comprise an ISDN network terminal part. The band division filters should be designed suitable for ISDN.

Although, the arrangement according to the invention has been described in this text concerning mostly HPNA stations, and especially a HPNA 1.1 station, it is evident that invention can be used in any kind of LANs leveraging the existing phonelines of subscribers. Furthermore, a DLS line can be another type than ADSL. The band-stop filter according to the invention can also be a separate element. So it is clear that the invention can be modified for a number of solutions, in the scope of the inventive idea.

What is claimed is:

1. An arrangement of a local area network in a customer's premise comprising a gateway through which the local area network is connected to an outside network via an xDSL subscriber line, in which local area network band division filters are connected to sockets of the local area network for separating voice band signals and traffic of the local area network both the voice band signals and the traffic distributed by the local area network, and for connecting voice band terminals and network stations to the local area network, wherein the band division filter comprises two parts, the first part being formed from a low-pass filter between the voice band terminal and the local area network, and the second part being formed from a band stop filter between the network station and the local area network, and wherein the band stop filter comprises a transformer between wires of a pair line coming from the local area network, and a resistor and capacitor connected to one of said wires parallel with a first winding of the transformer, and furthermore another resistor and capacitor connected to the other wire parallel with a second winding of the transformer, said components forming a filtering element and connecting the network station to the local area network.

2. An arrangement according to claim 1, wherein at least two filtering elements are connected in series.

3. An arrangement according to claim 2, wherein the arrangement further comprises at least one transversal element between the lines.

4. An arrangement according to claim 1, wherein the filtering element further comprises a transversal element between the lines.

5. An arrangement according to claim 1, wherein the band division filter comprises two parts, the first part being formed from a low-pass filter between the voice band terminal and the local area network, and the second part being formed from a band stop filter between the network station and the local area network.

6. An arrangement of a local area network in a customer's premise comprising a gateway through which the local area network is connected to an outside network via an xDSL subscriber line, in which local area network band division filters are connected to sockets of the local area network for separating voice band signals and traffic of the local area network both the voice band signals and the traffic distributed by the local area network, and for connecting voice band terminals and network stations to the local area network,
wherein transmission lines of the local area network are formed from telephone lines in the customer's premise,
the local area network is a Home PNA network, and
the band division filter comprises two parts, the first part being formed from a low-pass filter between the voice band terminal and the local area network, and the second part being formed from a band stop filter between the network station and the local area network, and
wherein the band stop filter comprises a transformer between wires of a pair line coming from the local area network, and a resistor and capacitor connected to one of said wires parallel with a first winding of the transformer, and furthermore another resistor and capacitor connected to the other wire parallel with a second winding of the transformer, said components forming a filtering element and connecting the network station to the local area network.

7. An arrangement according to claim 6, wherein at least two filtering elements are connected in series.

8. An arrangement according to claim 7, wherein the arrangement further comprises at least one transversal element between the lines.

9. An arrangement according to claim 6, wherein the filtering element further comprises a transversal element between the lines.

10. An arrangement according to claim 6, wherein the band division filter comprises two partes, the first part being formed from a low-pass filter between the voice band terminal and the local area network, and the second part being formed from a band stop filter between the network station and the local area network.

11. An arrangement of a local area network in a customer's premise comprising a gateway through which the local area network is connected to an outside network via an xDSL subscriber line, in which local area network band division filters are connected to sockets of the local area network for separating voice band signals and traffic of the local area network both the voice band signals and the traffic distributed by the local area network, and for connecting voice band terminals and network stations to the local area network,
wherein transmission lines of the local area network are formed from telephone lines in the customer's premise,
the xDSL subscriber line is an ADSL line, and the gateway is an ADSL terminal,
wherein the band division filter comprises two parts, the first part being formed from a low-pass filter between the voice band terminal and the local area network, and the second part being formed from a band stop filter between the network station and the local area network, and
wherein the band stop filter comprises a transformer between wires of a pair line coming from the local area network, and a resistor and capacitor connected to one of said wires parallel with a first winding of the transformer, and furthermore another resistor and capacitor connected to the other wire parallel with a second winding of the transformer, said components forming a filtering element and connecting the network station to the local area.

12. An arrangement according to claim 11, wherein at least two filtering elements are connected in series.

13. An arrangement according to claim 12, wherein the arrangement further comprises at least one transversal element between the lines.

14. An arrangement according to claim 11, wherein the filtering element further comprises a transversal element between the lines.

15. An arrangement according to claim 11, wherein the band division filter comprises two parts, the first part being formed from a low-pass filter between the voice band terminal and the local area network, and the second part being formed from a band stop filter between the network station and the local area network.

16. An arrangement of a local area network in a customer's premise comprising a gateway through which the local area network is connected to an outside network via an xDSL subscriber line, in which local area network band division filters are connected to sockets of the local area network for separating voice band signals and traffic of the local area network both the voice band signals and the traffic distributed by the local area network, and for connecting voice band terminals and network stations to the local area network,
wherein transmission lines of the local area network are formed from telephone lines in the customer's premise,
the xDSL subscriber line is an ADSL line, the gateway is an ADSL terminal, the local area network is a HomePNA network,
wherein the band division filter comprises two parts, the first part being formed from a low-pass filter between the voice band terminal and the local area network, and the second part being formed from a band stop filter between the network station and the local area network, and
wherein the band stop filter comprises a transformer between wires of a pair line coming from the local area network, and a resistor and capacitor connected to one of said wires parallel with a first winding of the transformer, and furthermore another resistor and capacitor connected to the other wire parallel with a second winding of the transformer, said components forming a filtering element and connecting the network station to the local area network.

17. An arrangement according to claim 16, wherein at least two filtering elements are connected in series.

18. An arrangement according to claim 17, wherein the arrangement further comprises at least one transversal element between the lines.

19. An arrangement according to claim 16, wherein the filtering element further comprises a transversal element the lines.

20. A band division filter for a local area network in a customer's premise wherein the filter is connected to a socket of the local area network for separating voice band signals and traffic of the local area network both the voice band signals and the traffic distributed by the local area network, and for connecting voice band terminals and network stations to the local area network, wherein the band division filter comprises two parts, the first part being formed from a low-pass filter between the voice band terminal and the local area network, and the second part being formed from a band stop filter between the network station and the local area network, and wherein the band stop filter comprises a transformer between wires of a pair line coming from the local area network, and a resistor and capacitor connected to one of said lines parallel with a first winding of the transformer, and furthermore another resistor and capacitor connected to the other line parallel with a second winding of the transformer, said components forming a filtering element and connecting the network station to the local area network.

21. A filter according to claim 20, wherein at least two filtering elements are connected in series.

22. A filter according to claim 21, wherein the filter further comprises at least one transversal element between the lines.

23. A filter according to claim 20, wherein the filtering element further comprises a transversal element between the lines.

* * * * *